United States Patent [19]

Masaki

[11] 4,384,361

[45] May 17, 1983

[54] SELECTIVE CALLING RECEIVER

[75] Inventor: Masaru Masaki, Tokyo, Japan

[73] Assignee: Nippon Electric Co., Ltd., Tokyo, Japan

[21] Appl. No.: 190,352

[22] Filed: Sep. 24, 1980

[30] Foreign Application Priority Data

Sep. 29, 1979 [JP] Japan .......................... 54-134805[U]

[51] Int. Cl.³ ............................................. H04B 5/04
[52] U.S. Cl. .................................... 455/31; 455/343;
340/311.1
[58] Field of Search .............................. 455/31, 35-38,
455/343, 227, 228, 229; 340/331, 311

[56] References Cited

U.S. PATENT DOCUMENTS

| Re. 28,222 | 11/1974 | Wycoff | 455/36 |
|---|---|---|---|
| 2,884,518 | 4/1959 | O'Neill | 455/343 |
| 3,611,156 | 10/1971 | Ward | 455/343 |
| 3,651,413 | 3/1972 | Wycoff | 455/36 |
| 3,748,584 | 7/1973 | Ribour et al. | 455/343 |
| 3,783,384 | 1/1974 | Wycoff | 340/311 |
| 4,181,893 | 1/1980 | Ehmke | 328/258 |
| 4,194,153 | 3/1980 | Masaki et al. | 340/311 |
| 4,249,165 | 2/1981 | Mori | 455/38 |

Primary Examiner—Benedict V. Safourek
Assistant Examiner—Stephen Chin
Attorney, Agent, or Firm—Laff, Whitesel, Conte & Saret

[57] ABSTRACT

A selective calling receiver includes a receiver section for demodulating carrier waves which are modulated by a calling signal. A decoder is connected to the output of the receiver section for selectively receiving the demodulated calling signal and for controlling the receiving operations. The power is intermittently applied to the receiver section under control of the decoder. A clock terminal in the decoder section receives a continuous supply of clock pulses during the period while the selective receiving operation is being conducted. During the period while the selective receiving operation is not conducted, the clock pulses are supplied to the clock terminal in the form of bursts or at a lower than clock rate.

9 Claims, 26 Drawing Figures

PREAMBLE SIGNAL · CALLING SIGNAL

PREAMBLE SIGNAL DETECT PULSE · DESIRED SIGNAL DETECT PULSE

SELECTIVE CALLING RECEIVER

The present invention relates to a selective calling receiver with a low power consumption.

In the prior art, there are known selective calling receivers as disclosed in the Japanese Patent Application Disclosure No. 72501/77 and a paper entitled "New Radio Paging System" by M. Komura et al, Japan Telecommunications Review, pp.217-225, July, 1977.

In this type of receivers, power is supplied to the receiver section only for the duration of a group signal assigned to its own receiver. The power is not supplied during the other group signal durations, thereby reducing the power consumption. However, even with this type of receivers, the power consumption presents a problem because power is applied constantly to the decoder section which processes the signals received by the receiver. In order to reduce the power consumption at the decoder, a micro-processor unit (CPU) or the like is used for the decoder which is comprised of a CMOS (Complementary Metal-Oxide-Silicon) device known for its small power consumption. Yet, the matter of power consumption still remains with CMOS structure, if the processing is conducted at a high speed.

The primary object of the present invention is to provide a selective calling receiver wherein the power consumption is reduced by uniquely controlling CPU clock pulses during the actual time while the high speed processing is needed at CPU (as when receiving calling signals) and during the actual time while the processing is rather limited at CPU (as when the power to the receiver section is cut off).

The second object of the present invention is to provide a selective calling receiver with a smaller power consumption, by lowering the clock frequency (or clock rate) supplied to CPU during the period while the power is cut off to the receiver section. The power consumption at a CPU comprised of CMOS device corresponds to the clock frequency.

The third object of the present invention is to provide a selective calling receiver with a reduced power consumption at a CPU, by counting the clock pulses or signals and sending those pulses to the decoder (CPU) for a short duration every time that the value of the counted clock pulses or signals reaches a predetermined value.

According to the present invention, a selective calling receiver has a receiver section for demodulating the carrier waves modulated by the calling signal. A decoder is connected to the output of the receiver section for selectively receiving the demodulated calling signal and controlling the receiving operation. The power is supplied intermittently to the receiver section under control of the decoder. The decoder section includes a clock terminal and means for generating clock pulses which are continuously supplied to the clock terminal during the period while the selective receiving operation is being conducted. During the period while the selective receiving operation is not being conducted, the clock pulses are supplied to the clock terminal either in the form of bursts or at a lower rate.

The above-mentioned objects and other features of this invention will become more apparent by reference to the following description taken in conjunction with the accompanying drawings, wherein:

FIGS. 11(a)–11(e) show the waveforms for the respective points (d), (f), (h), (i) and (p) of FIG. 10.

Figure 1:
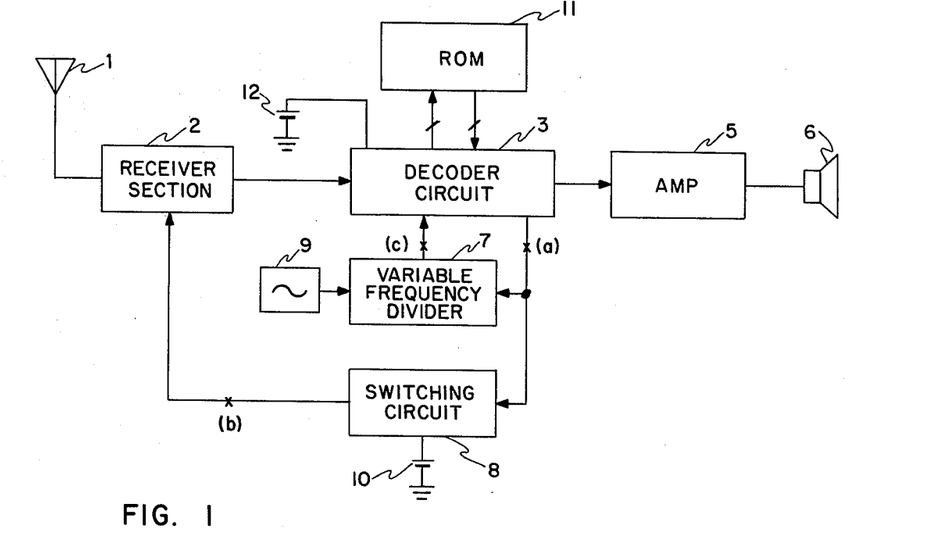
FIG. 1 shows a block diagram of first embodiment of a receiver of the present invention.

In FIG. 1, an antenna 1 is connected to a receiver section 2 the output of which is connected to a decoder circuit 3. The output of the decoder circuit 3, in turn, is connected to a speaker 6 via an amplifier 5. The decoder circuit 3 is connected to ROM (Read Only Memory) 11, a variable frequency divider 7, a battery 12 and a switching circuit 8. The output from a power source 10 is supplied to the receiver section 2 under the control of the switching circuit 8.

An oscillator 9 is connected to the variable frequency divider 7 the output of which is connected to the decoder circuit 3. The carrier waves modulated by the calling signals, etc. (See FIG. 9) are demodulated to the baseband signals in the receiver section 2. The decoder circuit 3 decodes the demodulated signals, and generates an alert tone when the decoded signals coincides with its own calling signal stored in ROM 11. The alert tone is supplied to the speaker 6 via the amplifier 5, to generate the sound.

Figure 2:
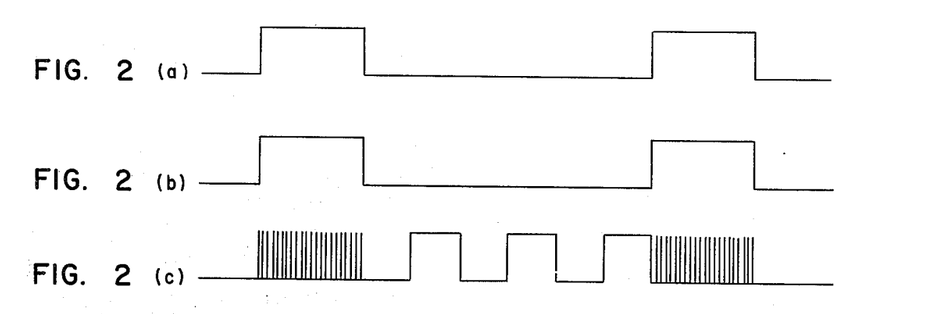
FIGS. 2(a), 2(b) and 2(c) show examples of output waveforms for the respective points (a),(b) and (c) of FIG. 1.

The switch circuit 8 intermittently supplies the power to receiver 2, as shown in FIG. 2(b), according to the timing (FIG. 2(a)) from the decoder circuit 3, thereby decreasing the power consumption. The variable frequency divider 7 is a generator circuit for clock pulses which are to be used in the decoder circuit 3. In other words, the clock pulses generated at the oscillator 9 are frequency-divided at the variable frequency divider 7 and supplied to the decoder circuit 3, as the clock signals.

The frequency dividing ratio of the variable frequency divider 7 is controlled by the output (FIG. 2(a)) from the decoder circuit 3. That is, when the output of the decoder circuit 3 is at a high level, or when the power is supplied to make the receiver section 2 ready to receive signals, the frequency dividing ratio is set at a small value to become a high clock rate as shown in FIG. 2(c). When the output of the decoder 3 is set at a low level, the dividing ratio is set in circuit 7 at a large value, to become a low clock rate as shown in FIG. 2(c). When the power from the power source 10 is being supplied to the receiver 2, the decoder circuit 3 needs an high clock rate to receive and process the calling signals. However, when the power is not being supplied to the receiver, then, there is no need for a receiving operation and the decoder circuit 3 merely determines the time for delivering the next supply of the power. Accordingly, there are no difficulties whatsoever for operation of the circuit, even with the low-rate clock.

The decoder circuit 3 comprises a one-chip CPU composed of CMOS. The power consumption greatly fluctuates depending on the clock rate. For instance, the current consumption of a CMOS, per gate, is 10 mA at 1 MHz clock frequency as in the case of CD4000A, and the consumption decreases to about 1 mA at 100 KHz. Accordingly, if the clock rate is switched responsive to the output of the decoder circuit (FIG. 2(a)) as discussed above, the power consumption of the decoder may be greatly decreased.

Figure 3:
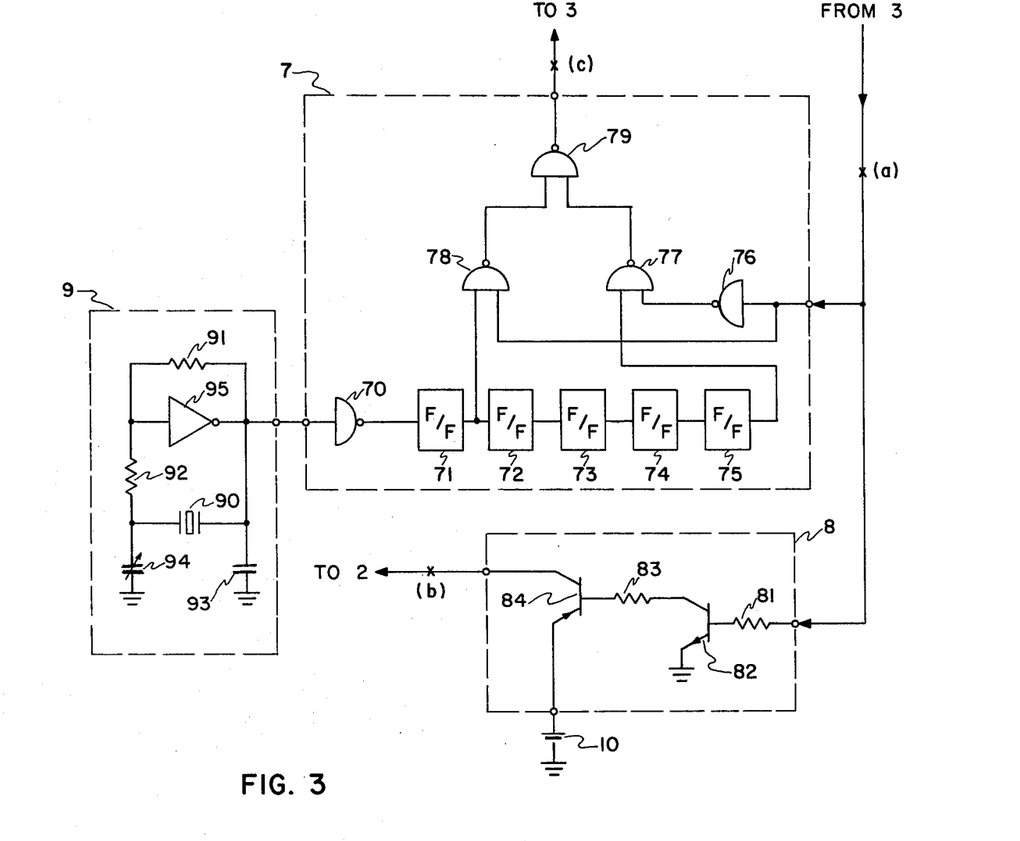
FIG. 3 is a circuit diagram for the variable frequency divider circuit, the switch circuit and the oscillation circuit shown in FIG. 1.

FIG. 3 shows the circuit diagrams of the oscillation circuit 9, the variable frequency divider 7 and the switching circuit 8 shown in FIG. 1. The oscillation circuit 9 comprises a crystal oscillator 90, resistors 91 and 92, a capacitor 93, a variable capacitor 94 and an inverter 95. The variable capacitor 94 is used for controlling the oscillation frequency.

At the variable frequency divider 7, the output from the oscillation circuit 9 is supplied to an inverter 70 which acts as a buffer. The output of the inverter 70 is frequency-divided by flip-flops (FF) 71 to 75. Each of FF divides the input frequency by 2 and the output frequency at FF 75 becomes 1/16 of that of FF 71. The NAND gates 77 to 79 are the gate circuits for selecting the output clock pulses from FF's 71-75. The clock switch signals (or the battery saving signals) from the decoder circuit 3 are supplied directly to the NAND gate 78, and inverted at the inverter 76, to be supplied to the NAND gate 77. Outputs of the NAND gates 77 and 78 are connected to NAND gate 79, and when the input at the inverter 76 (the output from the decoder) is at a high level. The high-rate clock pulses from FF 71 are supplied to the decoder circuit 3 via the NAND gates 78 and 79. On the other hand, when the input to the inverter 76 is at a low level, the low-rate clock pulse from FF 75 is supplied to the decoder circuit 3 via the NAND gates 77 and 79. This will be more clearly understood by reference to FIGS. 2(a) and 2(c).

The switching circuit 8 comprises resistors 81 and 83 and transistors 82 and 84. When the output of the decoder circuit 3 is at a high level, the transistors 82 and 84 become conductive, and the current as shown in FIG. 2(b) is supplied from the battery 10 via the transistor 84 to the receiver 2. When the output from the decoder circuit 3 is at a low level, the transistors 82 and 84 become non-conductive, and the power supply to the receiver section 2 is cut off.

Figure 4:
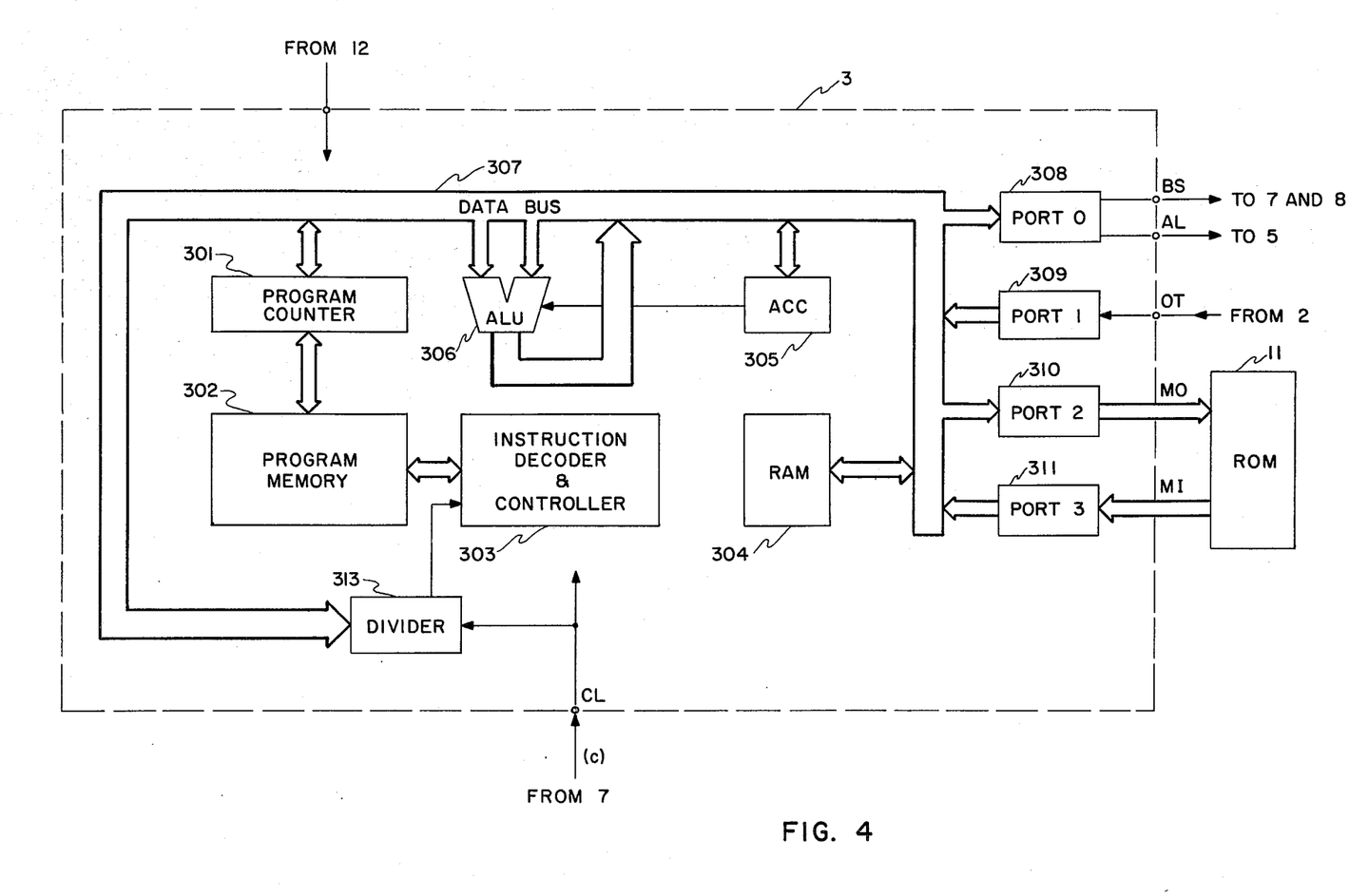
FIG. 4 is a block diagram for the decoder shown in FIG. 1.

The decoder 3 shown in FIG. 1 is further described in detail in FIG. 4. In a program memory 302 is stored a sequence of instructions which are to be carried out. The content of the address designated by a program counter 301 is transferred to an instruction decoder & controller 303. The instruction decoder & controller 303 decodes the information which is thus transferred, and provides the control signals corresponding to the instruction. The content of the program counter 301 is usually advanced by "1" after the information is transferred from the program memory 302 to the instruction decoder & controller 303. However, the content thereof is modified by the branch instruction, the jump instruction, etc. and the instructions are sequentially carried out.

At ALU 306, an arithmetic operation, logic operation, etc. are performed. RAM 304 is used in storing the process data, counting programs in subroutine and interruption, and cancelling program status. An ACC 305 either stores the result of the operations carried out by ALU 306, or exchanges the data between RAM 304 and Ports 308–311. The DATA BUS 307 is signal cables used in exchanging the data between various sections.

Port 308 and Port 310 are output ports for giving the signals from the data bus 307 to the outside circuits (circuits 5, 7, 8 and 11 of FIG. 1), and are provided with a latch function. Port 309 and Port 311 are input ports for receiving the signals from the outside circuits (circuits 1 and 11 of FIG. 1) of the decoder circuit 3 and for forwarding such signals to the DATA BUS 307. The divider 313 frequency-divides the system clock pulses which are received from the variable frequency divider 7. The ratio of the frequency division in divider 313 is set by the data from the program memory 302, supplied through DATA BUS 307. It is also possible to interrupt the instruction decoder & controller 303 with frequency divider output. A microcomputer $\mu$PD 7502G manufactured by NEC may be used as a decoder circuit.

The battery saving operation of the decoder circuit 3 is now explained with reference to FIG. 4. A terminal BS for the port 308 of the decoder circuit 3 is first set at a low level, which interrupts the supply of the power to the receiver section 2 (FIG. 1) by controlling the switching circuit 8, thus providing a battery savings. The variable frequency divider 7 provides low rate of clock pulses which are supplied to the terminal CL of the decoder circuit 3. A counter in RAM 304 (FIG. 4) counts up responsive to the program stored in program memory 302. When the count exceeds a predetermined number, a high level output is supplied to the terminal BS of the port 308. This count-up is conducted every time that an interruption occurs responsive to the output from the divider 313. This causes the clock pulses from the variable frequency divider 7 FIG. 1 become a high rate. The power from the power source 10 is supplied to the receiver section 2.

If the modulated carrier waves are received at this time and demodulated by the receiver section 2, the carrier waves are supplied to the port 309 (FIG. 4) of the decoder 3, for causing a receiving operation. During the receiving operation, the number set in a counter included in RAM 304 is changed in such a way that it will be counted up by the value corresponding to the duration of the receiving operation. The ratio of the frequency division is also set at a large value by the divider 313 in order to decrease the number of interruptions. After an initializing operation (such as described above) has been performed, the decoder circuit 3 performs a bit synchronization and a detection of preamble signals (FIG. 9). The counter in RAM 304 counts-up if there is an interruption from the divider 313 during such an operation.

If the count in the RAM 304 counter exceeds a predetermined number and no preamble signals have been detected during the receiving operation, the counter in the RAM is initialized to achieve the above-mentioned battery saving status. The ratio of the frequency division by the divider 313 is also set at a small value for battery saving purposes, and this cases the output of the terminal BS of the port 308 to be at a low level. Such an operation is repeated until a preamble signal is received.

The instance discussed above dealt with the operation which occurs if no preamble signal has been received. The next operation will be now described wherein a preamble signal is received. The receiver section 2 (FIG. 1) demodulates the modulated carrier waves received during the period while the power source shown in FIG. 2(b) is turned on, and shapes the waveforms which are then sent to the decoder circuit 3 (FIG. 4). Since the preamble signals are predetermined, the receiver has its own signal pattern stored in its program memory 302, and it compares the stored pattern with the received signal responsive to its program operation. If the patterns coincide with each other, then the power of the receiver is kept turned "ON" for detection of the synchronizing word.

As the synchronizing word is stored in ROM 11, the read-out signal from the port 310 is given to ROM 11 to command a read out of the synchronizing word from the port 311 and to compare the same with the input signal. If coincident, the selective calling number, assigned to the receiver from ROM 11, is read out. The received signal and the calling number are compared at the word timing following the timing of the synchronizing word. If found coincident, the alert signal is supplied to the amplifier 5 (FIG. 1) from the terminal AL of the port 308 (FIG. 4). The amplifier 5 amplifies the alert signal and supplies the alert tone to the speaker 6. The speaker 6 in its turn generates the alert sound.

The description has been given, referring to the manner in which preamble signals are received, but the present invention is practical in the similar manner if the battery saving operation is conducted after synchronization by the synchronizing method disclosed in the above-mentioned Japanese Patent Disclosure No. 72501/77.

As explained above, the present invention facilitates obtaining a selective calling receiver with a reduced power consumption, at the decoder section.

Figure 5:
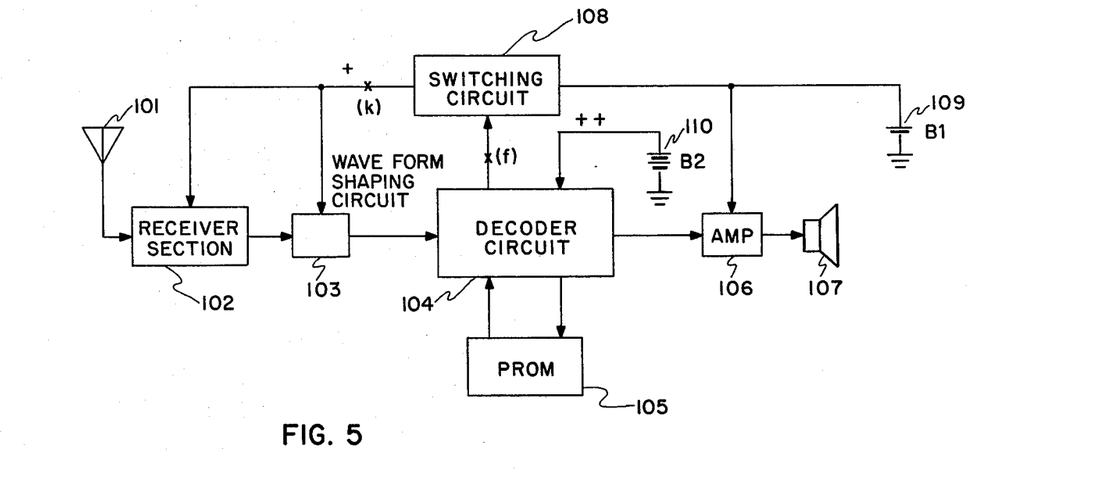
FIG. 5 is a block diagram of second embodiment of a receiver in accordance with the present invention.

FIG. 5 shows a second embodiment of the present invention, wherein an antenna 101 is connected to a receiver section 102. The output from the receiver 102 is connected to a decoder circuit 104 via a waveform shaping circuit 103. The decoder circuit 104 is connected to a speaker 107 via an amplifier 106.

A timing signal (battery saving signal) from the decoder circuit 104 is supplied to a switching circuit 108. The output of a power source 109 is controlled by the switching circuit 108 and supplied to the receiver section 102 and the waveform shaping circuit 103. The decoder circuit 104 is, on the other hand, connected to PROM (Programable Read Only Memory) 105. The desired calling number is written into the PROM 105 in advance. The calling signal which is received is compared to that written in number.

Figure 6:
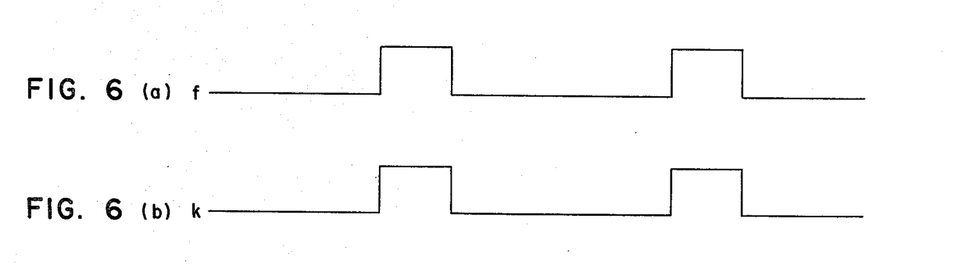
FIGS. 6(a) and 6(b) show waveforms for the respective points (f) and (k) shown in FIG. 5.

In the circuit composition such as is described above, the carrier waves modulated by the calling signal, etc. are demodulated into the baseband signal after having been amplified by the receiver section 102. This demodulated signal is further converted into a rectangular signal by the waveform shaping circuit 103, to be supplied to the decoder circuit 104. The decoder circuit 104 compares the demodulated signals with its own calling number written in PROM 105, and generates the alert signal which is to be fed to the amplifier 106 when found to be coincident. The amplifier 106 then amplifies the alert signal and supplies the alert tone to the speaker 107, which then generates the alert sound. The reference numeral 110 denotes a battery for the decoder circuit 104. The switching circuit 108 provides the output k as shown in FIG. 6(b), according to the timing f shown in FIG. 6(a) which is generated by the decoder circuit 104. The switching circuit 108 turns the power on and off at the receiver section 102 and at the waveform shaping circuit 103, in accordance with the output timing, in order to reduce the power consumption.

Figure 7:
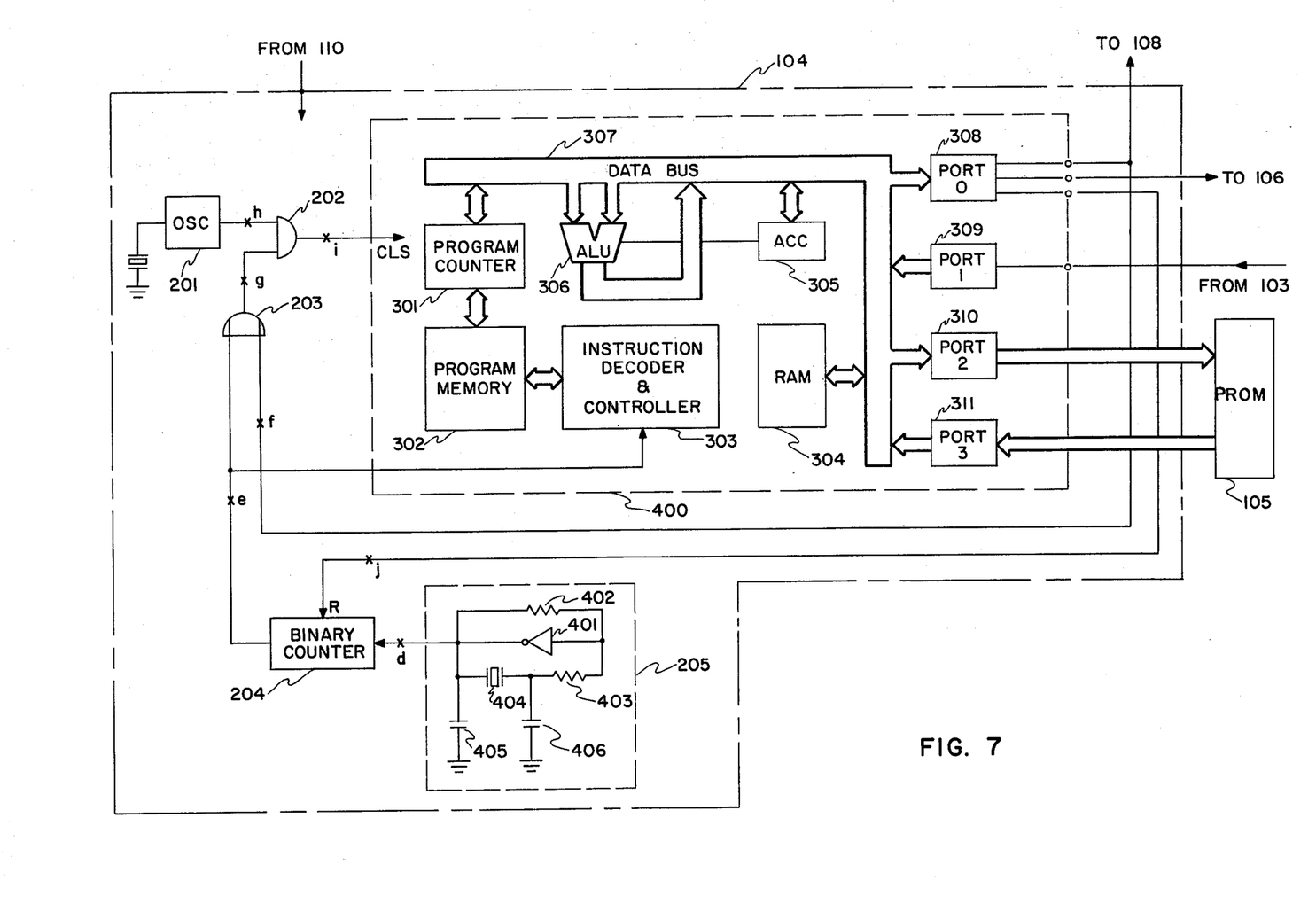
FIG. 7 is a block diagram of first embodiment of the decoder shown in FIG. 5.

The decoder circuit 104 and its peripheral circuit structure are shown in detail in FIG. 7. The receiving operation of FIG. 7 is now explained hereinbelow.

When the power is not supplied to the receiver section 102 (FIG. 5), there is no substantial problem even if the decoder circuit 104 (FIG. 7) does not operate. Nor will any difficulties be encountered if the system clock CLS (i) of the microprocessor 400 is suspended. The microprocessor comprising a CMOS realizes an efficient power consumption by stopping the system clock since its current consumption depends primarily on the operating frequency.

Figures 8A, 8G:
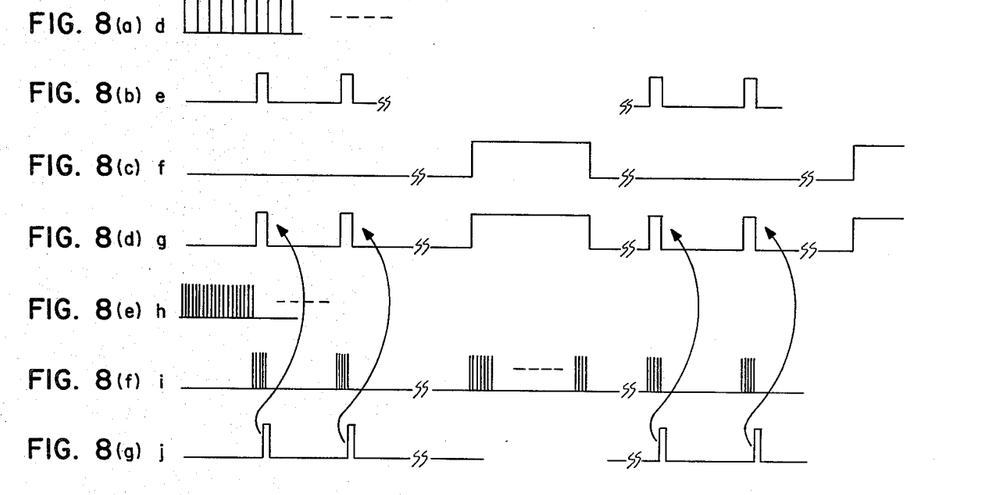
FIGS. 8 and 9 show waveforms of the various points shown in FIG. 7.

While the power is being supplied to the receiver section 102 (FIG. 5) and to the waveform shaping circuit 103 according to the timing f shown in FIG. 8(c) to receive its own calling signal, the decoder circuit 104 generates the low frequency (rate) signal d as shown in FIG. 8(a). This signal is emitted from a low frequency signal generator 205 shown in FIG. 7, and the divided signal e (FIG. 8(b)) is applied from a binary counter 204 to a NOR gate 203. Thus, the signal g (FIG. 8(d)) is applied to one input of an AND gates 202. A high frequency clock generator 201 provides a high frequency clock signals h (FIG. 8(e)) to operate AND Gate 202 and provide signals (FIG. 8(f)) in the form of bursts, as a system block CLS for driving a microprocessor 400 during the period when the signal g is at a high level. The microprocessor 400 then begins its operation. A high level of the signal e also functions as an interruption signal. The signal j (FIG. 8(g)) corresponds to an interruption signal which initializes a binary counter 204.

As a result of the above operation, when a predetermined number of interruptions are confirmed, the signal f (FIG. 8(c)) is applied to the switching circuit 108 (FIG. 5) and the NOR gate 203 (FIG. 7) through the port 308 of the microprocessor 400, to supply the high frequency clocks h to the microprocessor as a system clock via the AND gate 202 for a predetermined period of time defined by the signal f.

Figures 9A, 9C:
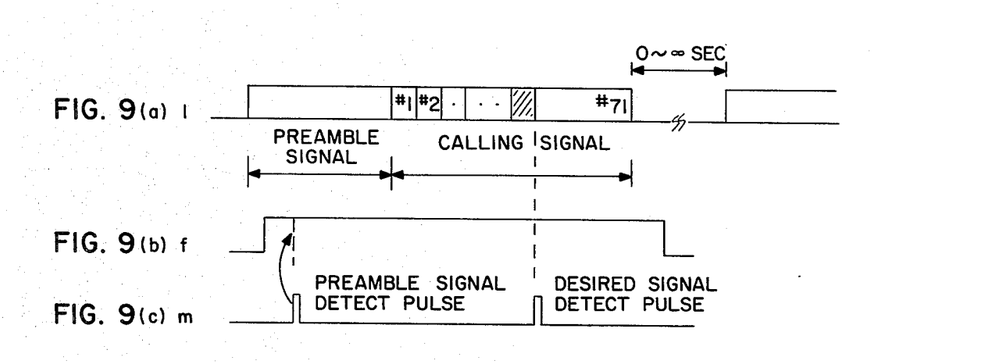

Thus, when the input signal l shown in FIG. 9(a) is received during the period while the signal f is at the high level and if the preamble signal detected, then it becomes feasible to realize a normal receiving operation by sufficiently extending the signal f to receive the calling signals, following the preamble signals as shown in FIG. 9(b). That is, the extended signal f controls the supply of the high frequency clock pulses h (FIG. 8(e)) to the microprocessor 400. The output supply of the power source which had been supplying the power to the receiver section 102 and the waveform shaping circuit 103, at predetermined intervals, is also extended. If the circuit detects its own calling signal among the received calling signals, the desired signal is detected as indicated in FIG. 9(c). Detection of the desired signal is realized by the alert sound supplied to the speaker 107 (FIG. 5) via the amplifier 106. The low frequency signal generator 205 comprises an inverter 401, resistors 402 and 403, a crystal oscillation element 404 and capacitors 405 and 406.

The explanation of the various points of the microprocessor 400 is omitted since they function in the same manner as those shown in FIG. 4.

Figure 10:
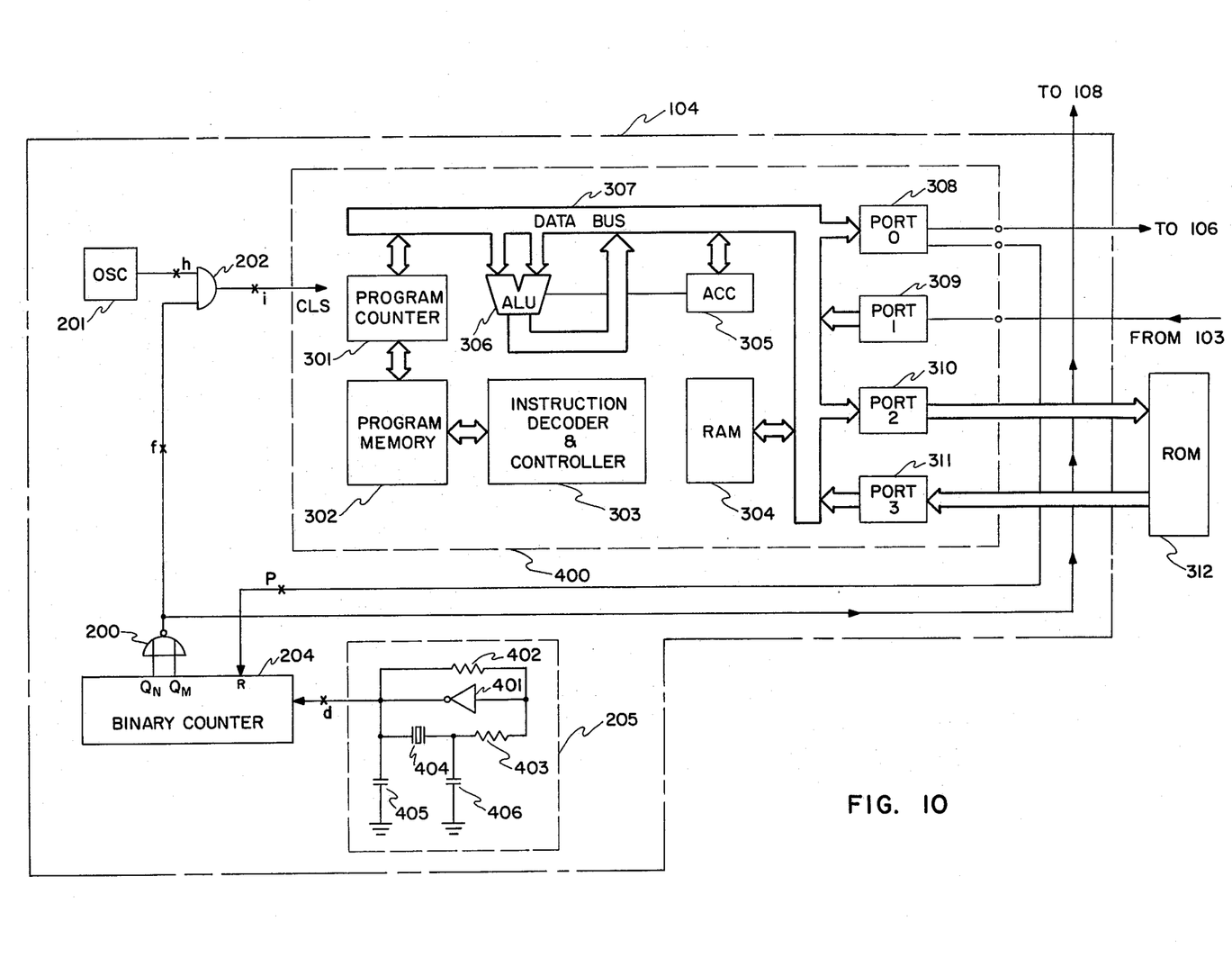
FIG. 10 is a block diagram of second embodiment of the decoder shown in FIG. 5.
Figures 11A, 11E:
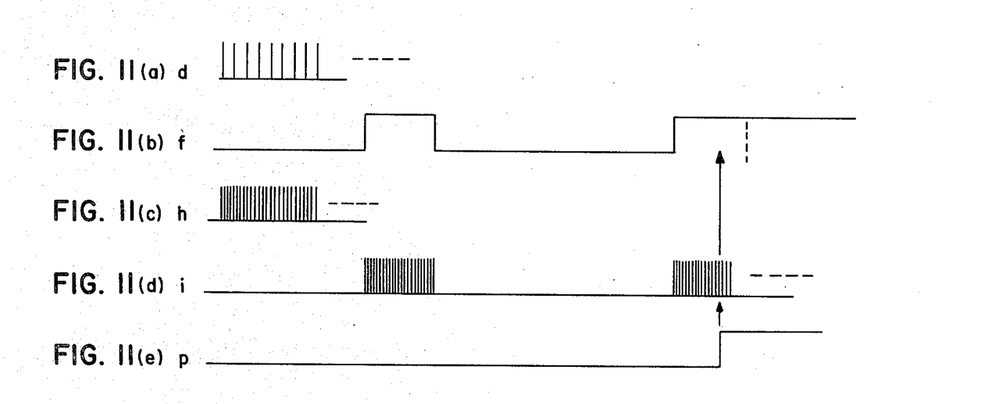

The second embodiment of the decoder circuit 104 (FIG. 5) is shown in FIG. 10 and the time charts for its various points in FIGS. 11(a) to 11(e). FIG. 10 is basically the same as FIG. 7 except that an NOR gate 200 is added to form the signal f which was explained for FIG. 7. The signal d (FIG. 11(a)) from the low frequency signal generator 205 is frequency-divided in the binary counter (for example, down counter) 204. The NOR gate 200 provides the signal f shown in FIGS. 8(c) and 11(b) in response to the outputs $Q_M$ and $Q_N$ of the counter 204. When the signal f is at high level, the high frequency clock pulses h (FIG. 11(c) are supplied as a system clock to the microprocessor 400 via the AND gate 202 and the power from the battery 109 is supplied to the receiver section 102. When the preamble signal (FIG. 9(a)) is detected during the receiving operation, the microprocessor 204 provides the signal p, shown in FIG. 11(e), through the port 308 to reset the binary counter 204. At the same time the NOR gate 200 provides a high level in response to the low level output of the binary counter 204 as shown in FIG. 11(b), thereby controlling the supply of the high frequency clock pulses h (FIG. 11(c)) to the microprocessor 400 and the supply of the battery power to the receiver section 102 so that the following calling signal shown in FIG. 9(a) can be detected and processed. A further explanation of FIG. 10 is omitted since the rest of the circuits is the same as those of FIG. 7.

Next to be described are the differences in the battery life, when the same battery is used for the receivers shown in FIGS. 5, 7 and 10 and for the conventional type receiver (where the power is constantly applied to the decoder circuit). The life of the battery (having a capacity of 150 mAH) at the decoder (having the current consumption of 200 μA in full operation) is as follows:

(1) when the conventional receiver is used, the battery life will become 150 mAH÷200 μA=750 H; and (2) when the receivers according to the present invention are used, If the "ON/OFF" ratio at the power source is selected to be 100 msec/16 msec in respect of the signal e of FIG. 8(b) and 75 msec/975 msec in respect of the signal f of FIG. 8(c), the signal e may be disregarded since the pulse duration is short. However, the "ON/OFF" operation of the signal f greatly influences the power consumption at the decoder circuit 104. Assuming that the current consumption at the low rate operating section is 5 μA, the mean current consumption I at the decoder section accompanying the signal f becomes $$I = \frac{200 \mu A \times 75 \text{ msec} + 5 \mu A \times 975 \text{ msec}}{1050 \text{ msec}} = 18.9 \mu A$$

Therefore, the battery life will become 150 mAH÷18.9 μA=7937 H

As is clear from the analysis above, the battery life of the receivers of the present invention will be about 10 times longer than that of the conventional system.

As hereinbefore discussed, the power consumption at the microprocessor is decreased remarkably by counting the low frequency clock pulses in the low speed operating block at the decoder circuit and supplying the high frequency clock signals of the high speed processing blocks at a predetermined timing correspondingly to the counted value as a system clock to the microprocessor.

What is claimed is:

1. A selective calling receiver comprising a receiver section means for demodulating a carrier wave which is modulated by a calling signal, power source means, decoder means connected to the output of said receiver section means for selectively decoding the demodulated calling signals and controlling a receiving operation of said selective calling receiver, CMOS microprocessor means requiring a first level of power for performing a decoding operation and a second level of power when not performing said decoding operation, said decoder means including a clock terminal and a power source terminal to which the output of said power source means is applied, means for generating first clock pulses, and means for continuously supplying said first clock pulses to said clock terminal during periods while said receiver section means is operating, said microprocessor means receiving said first clock pulses from said clock terminal which provide said first level of power to enable said decoding, and for controlling at least one of the number and rate of said first clock pulses to provide second clock pulses and for supplying said second clock pulses to said clock terminal during periods while said receiver section means is not operating, said second clock pulses received by said microprocessor means corresponding to said second level of power when the decoding operation is not being performed.

2. A selective calling receiver comprising a receiver section means for demodulating a carrier wave which is modulated by a calling signal, power source means, decoder means connected to the output of said receiver section means for selectively decoding the demodulated calling signal and controlling a receiving operation of the selective calling receiver, CMOS microprocessor means requiring a first level of power for performing a decoding operation and a second level of power when not performing said decoding operation, said decoder means including a clock terminal, means for generating clock pulses, and means for continuously supplying said clock pulses to said clock terminal during the period when said receiver section means is operating, said microprocessor means receiving clock pulses from said clock terminal which provide said first level of power to enable said decoding, and for controlling said clock pulses in such a way that said clock pulses are supplied to said clock terminal in the form of bursts during periods while said receiving operation is not being performed, said bursts of clock pulses received by said microprocessor means corresponding to said second level of power when the decoding operation is not being performed.

3. A selective calling receiver comprising a receiver section means for demodulating a carrier wave modulated by a calling signal, power source means, decoder means connected to the output of said receiver section means for selectively decoding the demodulated calling signal and for controlling a receiving operation of the selective calling receiver, CMOS microprocessor means requiring a first level of power for performing a decoding operation and a second level of power when not performing said decoding operation, and said decoder means including a clock terminal, means for generating clock pulses at a predetermined rate, and means for supplying said clock pulses to said clock terminal at said predetermined rate during periods while said decoding operation is being performed to provide said first level of power and thereby enable said decoding operation and for controlling said clock in such a way that said clock pulses are supplied to said clock terminal at a rate which is slower than said predetermined rate during periods while said receiver section means is not operating to provide said second level of power while said decoding is not being performed.

4. A selective calling receiver comprising a receiver section means for demodulating a carrier wave modulated by a calling signal, power source means, decoder means connected to the output of said receiver section for selectively decoding the demodulated calling signal and for controlling a receiving operation of the selective calling receiver, microprocessor means which requires a first level of power for performing a decoding operation and a second level of power when not performing said decoding operation, and said decoder means including a clock terminal, means for generating clock pulses, means for generating a narrow width pulse after each predetermined number of said clock pulses, and means for supplying said clock pulses to said clock terminal during periods while said receiver section means is operating in order to provide said first level of power to enable said microprocessor to provide said decoding, and for supplying only said narrow width pulses to said clock terminal during periods while said receiver section means is not operating in order to provide said second level of power while said decoding is not being performed.

5. A selective calling receiver comprising a receiver section means for demodulating a carrier wave modulated by a calling signal, power source means, decoder means connected to the output of said receiver section means for selectively controlling a decoding operation of the selective calling receiver responsive to the demodulated calling signal, microprocessor means requiring a first level of power for performing a decoding operation and a second level of power when not performing said decoding operation, said decoder means including a clock terminal, means for generating low speed clock pulses and high speed clock pulses, means for generating narrow width pulses responsive to each end of a predetermined number of said low speed clock pulses, and means for supplying said high speed clock pulses to said clock terminal during periods while said receiver section means is operating to provide said first level of power to enable said microprocessor to perform a decoding operation, and for supplying said high speed clock pulses to said clock terminal during only said narrow pulse width period while said receiver section means is not operated in order to provide said second level of power while said decoding is not being performed.

6. A selective calling receiver as claimed in any one of the claims 1 to 5, and means for intermittently supplying power to said receiver section means under control of said decoder means.

7. A selective calling receiver having stand-by and active signal receiving capabilities, said receiver comprising receiver section means for demodulating a carrier wave which is modulated by a calling signal; power source means; microprocessor means requiring a first level of power for performing a decoding operation and a second level of power when not performing said decoding operation, decoder means connected to the output of said receiver section means for selectively decoding the demodulated calling signal, for controlling a decoding operation of said selective calling receiver, and for providing alternate control pulses corresponding to first stand-by and to second active time durations, said decoder means including a clock terminal and a power source terminal to which the output of said power source means is applied; means for generating first clock pulses; means responsive to said alternate control pulses for controlling at least one of the number and rate of said first clock pulses to provide second clock pulses; means for supplying said first clock pulses to said clock terminal during said first time duration for providing said first level of power for enabling the performance of said decoding operation and for supplying said second clock pulses to said clock terminal during said second time duration for providing said second level of power in order to reduce power consumption in said decoder means during periods while said decoding operation is not being performed.

8. A selective calling receiver comprising receiver section means for demodulating a carrier wave which is modulated by a calling signal; power source means; microprocessor means requiring a first level of power for performing a decoding operation and a second level of power when not performing said decoding operation, decoder means connected to the output of said receiver section means for selectively decoding the demodulated calling signal, for controlling a decoding operation of said selective calling receiver, and for providing alternate control pulses of first and second time durations, said decoder means including a clock terminal and a power source terminal to which the output of said power source means is applied; means for generating clock pulses; means responsive to said alternate control pulses for supplying said clock pulses to said clock terminal during said first time duration to provide said first level of power when said microprocessor is performing a decoding operation, and for controlling said clock pulses in such a way that said clock pulses are supplied to said clock terminal in the form of bursts during said second time duration to provide said second level of power while said microprocessor is not performing said decoding operation.

9. A selective calling receiver comprising receiver section means for demodulating a carrier wave which is modulated by a calling signal; power source means; decoder means connected to the output of said receiver section means for selectively decoding the demodulated calling signal, for controlling a decoding operation of said selective calling receiver, and for providing alternate control pulses of first and second time durations, microprocessor means requiring a first level of power for performing a decoding operation and a second level of power when not performing said decoding operation, said decoder means including a clock terminal and a power source terminal to which the output of said power source means is applied; means for generating clock pulses of high speed and low speed; means responsive to said alternate control pulses for supplying said clock pulses of high speed to said clock terminal to provide said first level of power to enable said microprocessor to provide said decoding during said first time duration and for supplying said clock pulses of low speed to said clock terminal to provide said second level of power to said microprocessor during said second time duration while said decoding is not being performed.

* * * * *